United States Patent [19]

Muraki

[11] Patent Number: 5,448,357
[45] Date of Patent: Sep. 5, 1995

[54] POSITION DETECTING SYSTEM FOR DETECTING A POSITION OF AN OBJECT BY DETECTING BEAT SIGNALS PRODUCED THROUGH INTERFERENCE OF DIFFRACTION LIGHT

[75] Inventor: Masato Muraki, Inagi, Japan

[73] Assignee: Canon Kabushiki Kaisha, Tokyo, Japan

[21] Appl. No.: 160,208

[22] Filed: Dec. 2, 1993

[30] Foreign Application Priority Data

Dec. 10, 1992 [JP] Japan ................... 4-353436

[51] Int. Cl.$^6$ ............................................. G01B 9/02
[52] U.S. Cl. ...................................... 356/356; 356/349
[58] Field of Search ............... 356/349, 356, 363, 400, 356/401

[56] References Cited

U.S. PATENT DOCUMENTS

| | | | |
|---|---|---|---|
| 4,710,026 | 12/1987 | Magome et al. | 356/349 |
| 4,895,447 | 1/1990 | Jarisch et al. | 356/356 |
| 4,974,919 | 12/1990 | Muraki et al. | 350/6.6 |
| 5,153,773 | 10/1992 | Muraki et al. | 359/619 |
| 5,321,502 | 6/1994 | Matsumoto et al. | 356/349 |

FOREIGN PATENT DOCUMENTS 5087530  4/1993  Japan ................... 356/356

Primary Examiner—Samuel A. Turner
Assistant Examiner—Robert Kim
Attorney, Agent, or Firm—Fitzpatrick, Cella, Harper & Scinto

[57] ABSTRACT

A position detecting system is disclosed wherein lights being mutually coherent and having first and second frequencies, respectively, different from each other are produced, and the light of the first frequency is divided into a first light and a second light while the light of the second frequency is divided into a third light and a fourth light. The first, second, third and fourth lights are projected upon a diffraction grating on an object at different specific angles of incidence, respectively. A first beat signal is produced through interference between diffraction light resulting from diffraction of the first light by the diffraction grating and diffraction light resulting from diffraction of the fourth light by the diffraction grating, while a second beat signal is produced through interference between diffraction light resulting from diffraction of the second light by the diffraction grating and diffraction light resulting from diffraction of the third light by the diffraction grating. A phase difference between the first and second beat signals is detected to determine the position of the object, wherein the phases of the first and second beat signals advance oppositely with a displacement of the object.

20 Claims, 3 Drawing Sheets

POSITION DETECTING SYSTEM FOR DETECTING A POSITION OF AN OBJECT BY DETECTING BEAT SIGNALS PRODUCED THROUGH INTERFERENCE OF DIFFRACTION LIGHT

FIELD OF THE INVENTION AND RELATED ART

This invention relates to a position detecting system suitably usable in a semiconductor device manufacturing exposure apparatus (stepper), for example, for relatively positioning a reticle (first object) and a wafer (second object) when a fine electronic circuit pattern formed on the reticle is to be projected and lithographically transferred to the surface of the wafer.

In an exposure apparatus for the manufacture of semiconductor devices, relative positioning of a reticle and a wafer is an important factor for attaining a higher-degree of integration of each semiconductor device.

Particularly, for the alignment process to be made in recent exposure apparatuses, an alignment precision of a submicron order or higher precision is required to meet further increases in integration of each semiconductor device. As a high-precision alignment method which meets such a requirement, many proposals have been made to use optical heterodyne interference.

FIG. 1 is a schematic view for explaining the principle of a known position detecting system which uses the optical heterodyne interference method. As illustrated, a portion of the light beam from a laser light source 201, which produces two lights of different frequencies (wavelengths) and being polarized perpendicularly, is extracted by reflection at a beam splitter 202. Two lights having slightly different frequencies (wavelengths) and having planes of polarization intersecting perpendicularly, are caused to interfere with each other by means of a polarizer 212 with their planes of polarization registered. Then, a photodetector 203 detects the light intensity of the resultant interference light. In response, it supplies a reference beat signal to a signal processing controller 211.

On the other hand, the light from the laser light source 201 passing through the beam splitter 202 impinges on a polarization beam splitter 204. By this polarization beam splitter 204, the light is divided into two lights of slightly different frequencies (wavelengths), each light comprising linearly polarized light having only a horizontal (transverse) component or a vertical (longitudinal) component. After passing through a Fourier transformation lens 206, the lights are incident at desired angles on a reflection type diffraction grating 207 which is provided on a wafer (not shown) for position detection. Diffraction lights obtained from the diffraction grating 207 go through the Fourier transformation lens 206 and impinge on a mirror 208. The planes of polarization of these two mutually orthogonal lights having slightly different frequencies are registered by means of a polarizer 209, whereby they are caused to interfere with each other. Photodetector 210 detects the light intensity of the resultant interference light, and it applies a corresponding light beat signal to the signal processing controller 211.

The signal processing controller 211 detects the phase difference between the reference beat signal and the light beat signal, and determines the amount of deviation of the wafer position with respect to a reference position.

In the position detecting system of FIG. 1, the deviation between the wafer position and the reference position is calculated on the basis of detection of the phase difference between the reference beat signal and the light beat signal. If the phase difference is $\theta$ (radian), the pitch of the diffraction grating 207 formed on the wafer surface is P ($\mu$m), the order of the diffraction light detected is n (($\pm$n)-th order light), and the deviation between the wafer position and the reference position is $\Delta x$ ($\mu$m), then the following relation is given:

$$\theta = (4\pi n/P)\Delta x \qquad (a)$$

It is clear from equation (a) that, if the detection resolution of the phase $\theta$ of the signal processing controller 211 is constant, the detection resolution of the positional deviation $\Delta x$ between the wafer position and the reference position becomes higher with a higher order (n) of diffraction light detected or with a narrower pitch (P) of the diffraction grating formed on the wafer surface. However, if the diffraction order n is high, the intensity of the diffraction light is low and the signal-to-noise ratio (S/N ratio) during the signal processing procedure is low. Also, the pitch P of the diffraction grating cannot be made so small, with restrictions in the process of manufacture of the same. Thus, improving the detection resolution in this type of position detecting system is limited.

Additionally, in this type of position detecting system, the two lights impinging on the diffraction grating at different angles travel along different light paths. This leads to a change in phase produced by an error factor in the light path (such as fluctuations in air, for example) being added to a phase difference produced in accordance with the positional deviation between the wafer position and the reference position. This directly degrades the stability of detecting the positional deviation $\Delta x$.

Further, while a lateral Zeeman laser may usually be used as a light source for providing two lights of slightly different frequencies and having orthogonal planes of polarization, the planes of polarization of the two lights of different wavelengths from such a lateral Zeeman laser do not intersect exactly perpendicularly. This means that a polarization beam splitter does not separate these lights of different wavelengths completely. Such incompleteness then leads to an error in the measurement of phase. Furthermore, when linearly polarized light is reflected, the complex reflectivity ratio between the p-polarized light and s-polarized light changes. As a result of this, the optical axis of the linearly polarized light rotates, or the light is transformed into an elliptically polarized light. This is a bar to completely separating two lights of different wavelengths by using a polarization beam splitter.

SUMMARY OF THE INVENTION

It is an object of the present invention to provide an improved position detecting system based on an optical heterodyne method, by which high detection resolution as well as high stability of detection are assured. This can be done in one aspect of the present invention by providing an arrangement by which, for detection of a deviation of an object (such as a wafer) with respect to a reference position, plural light beat signals are produced and by which a phase difference between those two light beat signals of them having oppositely advancing phases with the positional deviation between the wafer position and the reference position is detected.

In accordance with an aspect of the present invention, there is provided a position detecting system for detecting a position of an object, said system comprising: light producing means for producing lights being mutually coherent and having first and second frequencies, respectively, different from each other; an optical system including (i) light dividing means for dividing the light of the first frequency into a first light and a second light, and for dividing the light of the second frequency into a third light and a fourth light, and (ii) light guiding means for projecting the first, second, third and fourth lights upon a diffraction grating on the object at different angles of incidence, respectively, wherein the angle defined by the fourth light with respect to the first light and the angle defined by the third light with respect to the second light have opposite signs and the same magnitude; and a detection system including (iii) first detecting means for detecting a first beat signal produced through interference between diffraction light resulting from diffraction of the first light by the diffraction grating and diffraction light resulting from diffraction of the fourth light by the diffraction grating, (iv) second detecting means for detecting a second beat signal produced through interference between diffraction light resulting from diffraction of the second light by the diffraction grating and diffraction light resulting from diffraction of the third light by the diffraction grating, and (v) position measuring means for detecting a phase difference between the first and second beat signals to determine the position of the object, wherein the phases of the first and second beat signals advance oppositely with a displacement of the object.

In one preferred form of the invention, said light producing means includes a light source for providing coherent light of a single frequency, and means for dividing the light from said light source into two and for imparting a frequency shift to at least one of the two lights.

In one preferred form of the invention, the angles of incidence of the first, second, third and fourth lights upon the diffraction grating are determined in accordance with the following relations:

$$\theta_1 = -\sin^{-1}(N\lambda_0/P) - \theta_0$$

$$\theta_2 = -\theta_1$$

$$\theta_3 = -\sin^{-1}(N\lambda_0/P) + \theta_0$$

$$\theta_4 = -\theta_3$$

where $\theta_1$ is the angle of incidence of the first light, $\theta_2$ is the angle of incidence of the second light, $\theta_3$ is the angle of incidence of the third light, $\theta_4$ is the angle of incidence of the fourth light, $\lambda_0$ is the wavelength substantially the same as that of light having the first or second frequency, P is the pitch of the diffraction grating, N is an integer and $\theta_0$ is a value not equal to zero.

In one preferred form of the invention, said first detecting means detects light diffracted by the diffraction grating in a $-\theta_0$ direction and said second detecting means detects light diffracted by the diffraction grating in a $\theta_0$ direction.

In one preferred form of the invention, said optical system includes means for adjusting the angles of incidence of the first, second, third and fourth lights upon the diffraction grating.

In one preferred form of the invention, said light guiding means determines the angles of incidence of the first, second, third and fourth lights upon the diffraction grating in accordance with the positions of incidence of the first, second, third and fourth lights, respectively, upon said light guiding means, wherein said incidence angle adjusting means adjusts the positions of incidence of the first to fourth lights upon said light guiding means.

In one preferred form of the invention, said light dividing means comprises an optical element having a half mirror, and said incidence angle adjusting means adjusts the positions of incidence of the light of the first frequency and the light of the second frequency upon said optical element.

In one preferred form of the invention, said optical element comprises a Kester prism.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
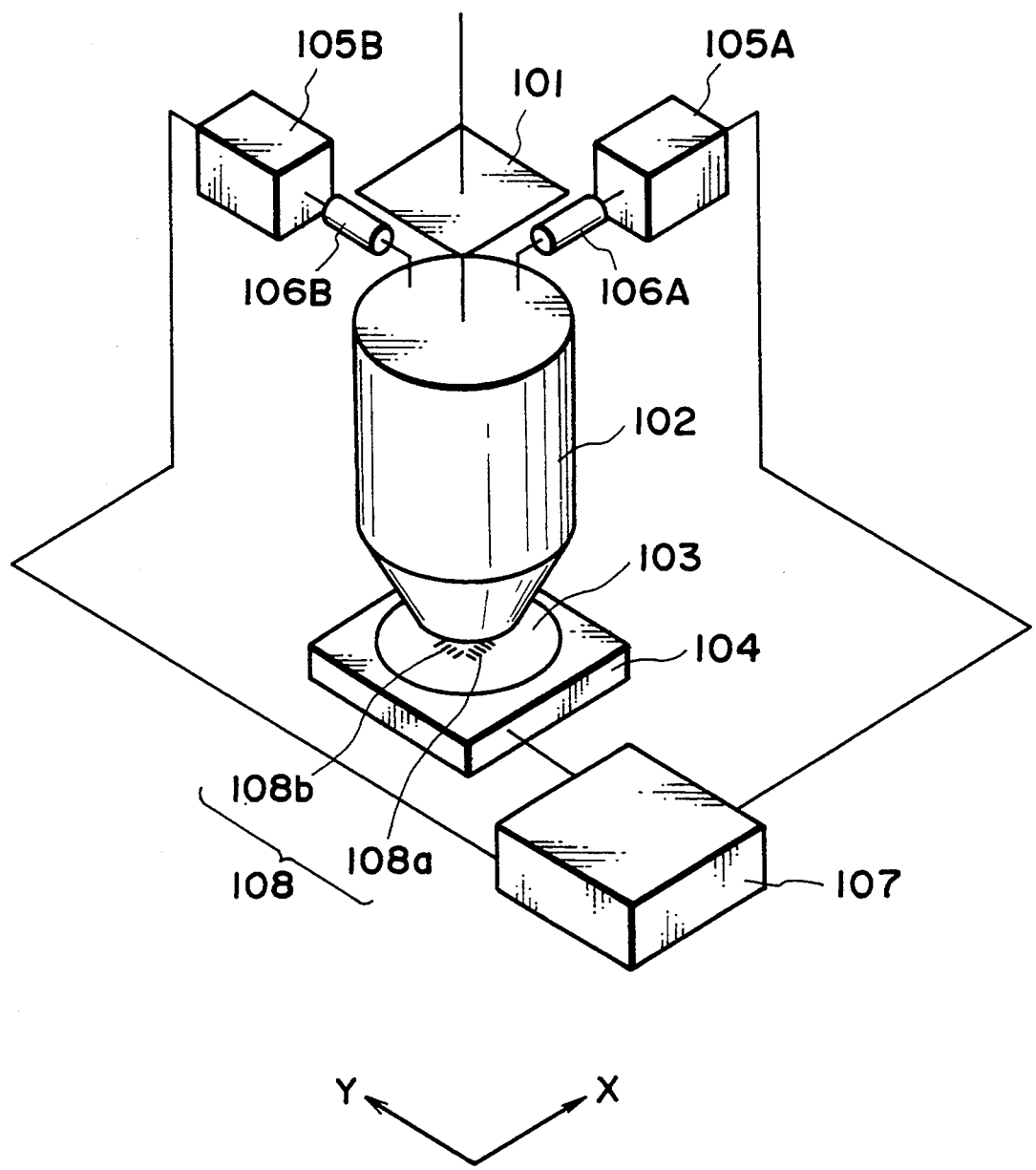
FIG. 2 is a schematic view of a main portion of a semiconductor device manufacturing projection exposure apparatus into which a position detecting system according to a first embodiment of the present invention is incorporated.
Figure 3:
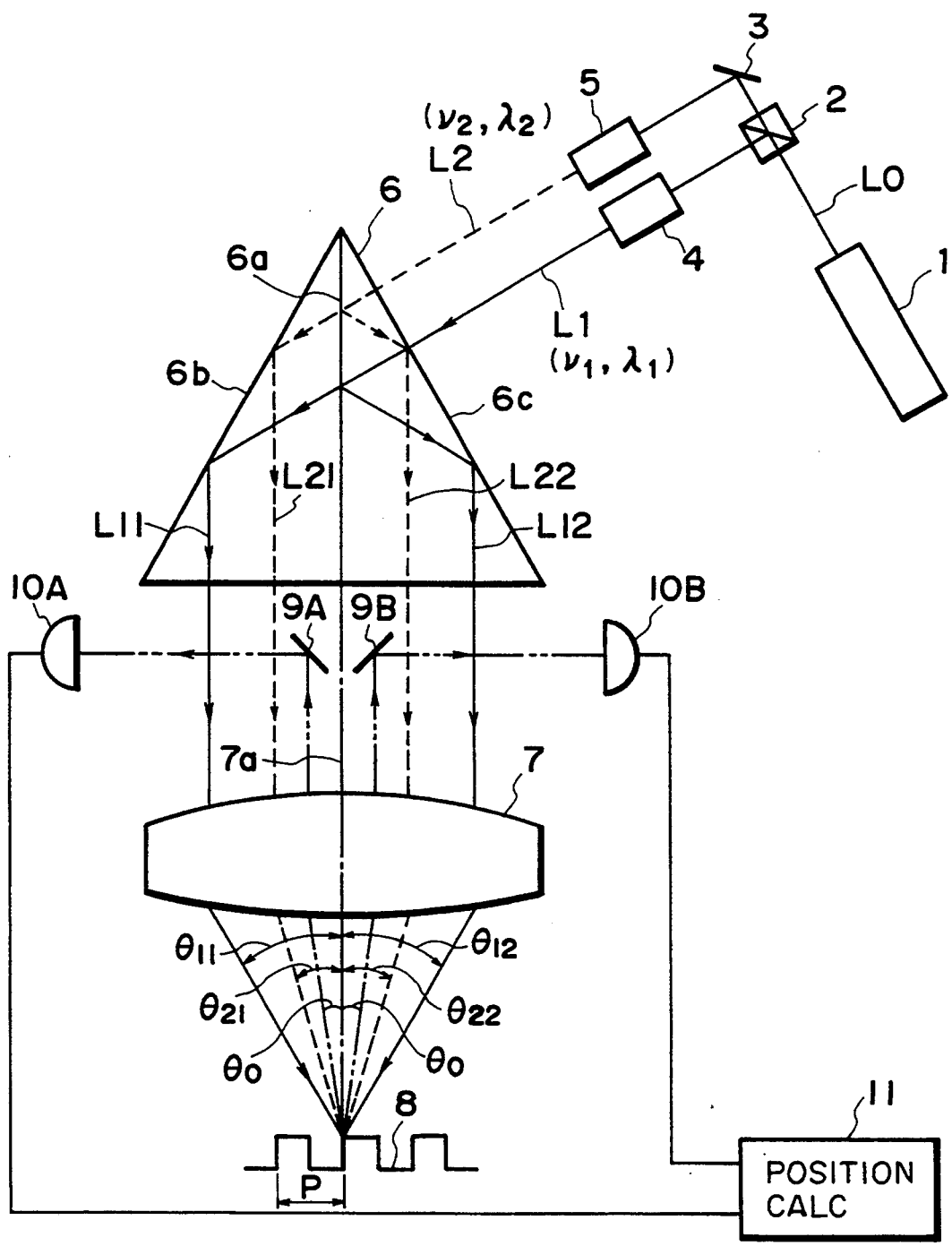
FIG. 3 is a schematic view for explaining the principle of position detection through the position detecting system according to the first embodiment of the present invention.

FIG. 2 is a schematic view of a main portion of a semiconductor device manufacturing projection exposure apparatus (stepper) into which a position detecting system according to a first embodiment of the present invention is incorporated. FIG. 3 is a schematic view for explaining the principle of position detection through the position detecting system according to the first embodiment of the present invention.

In FIG. 2, a reticle 101 is illuminated with exposure light of a wavelength λ from an illumination device (not shown), and an electronic circuit pattern of the illuminated reticle is projected by a projection lens 102 in a reduced scale on a wafer 103 which is placed on an X-Y stage 104.

The alignment of the reticle 101 and the wafer 103 is made in the following manner. The wafer 103 has two diffraction gratings 108a and 108b extending in orthogonal directions. One (108a) of these diffraction gratings is irradiated with light from a position detecting system 105A of the present invention, through a compensation optical system 106A for the position detecting system and through the projection lens 102. Diffraction light from the diffraction grating 108a goes back through the projection lens 102 and the compensation optical system 106A in reversed order as it is illuminated, and is received by the position detecting system 105A, by which the current relationship between a reference position and the position of the wafer with respect to the X-axis direction is detected.

Similarly, the other diffraction grating 108b is used in combination with another position detecting system 105B to detect the current relationship between the reference position and the wafer position with respect to the Y-axis direction. It is to be noted that the position of the reticle and the reference position as determined by the position detecting systems 105A and 105B are measured beforehand.

The obtained positional information is supplied to a controller 107. The controller 107 calculates a desired position of the wafer with respect to the reticle 101, and it moves the X-Y stage 104 to a corresponding position. Then, the electronic circuit pattern of the reticle is projected in a reduced scale onto the wafer and thus the pattern is lithographically transferred onto the same.

Now, the principle of position detection in the present invention will be explained with reference to FIG. 3.

In FIG. 3, denoted at 1 is a laser light source (frequency $\gamma_0$, wavelength $\lambda_0$). The wavelength $\lambda_0$ differs from the exposure wavelength $\lambda$. Light $L_0$ from the laser light source 1 is divided by a beam splitter 2 into two. One of the divided lights is directed to an acoustooptic modulator 4, while the other is directed to another acoustooptic modulator 5 through a mirror 3. Each acoustooptic modulator 4 or 5 shifts the frequency of the light, having the frequency $\gamma_0$. The quantity of shift of frequency by the modulator 4 is slightly different from that by the modulator 5. Thus, the frequency of the light $L_1$ is shifted to $\gamma_1$ (wavelength $\lambda_1$), and the frequency of the light $L_2$ is shifted to $\gamma_2$ (wavelength $\lambda_2$).

The lights $L_1$ and $L_2$ are received by a Kester prism (light dividing means) 6 in which each light is bisected. With the use of reflection surfaces 6b and 6c, a total of four lights $L_{11}$, $L_{12}$, $L_{21}$ and $L_{22}$ are provided and they emerge in parallel to each other. These four lights are incident on a Fourier transformation lens (illuminating means) 7 (in FIG. 2, the compensation optical system 106 of the position detecting system and the projection lens 102 cooperate to provide the function of the Fourier transformation lens). Then, the lights are projected to a reflection type diffraction grating 8 (pitch P) formed on the wafer (not shown).

Here, the four lights illuminating the wafer have angles of incidence which are set as follows (each angle being taken with respect to the optical axis 7a of the Fourier transformation lens 7, and the clockwise direction is taken as positive):

$$\theta_{11} = -\sin^{-1}(\lambda_0/P) - \theta_0$$

$$\theta_{12} = -\theta_{11}$$

$$\theta_{21} = -\sin^{-1}(\lambda_0/P) + \theta_0$$

$$\theta_{22} = -\theta_{21}$$

wherein $\theta_{11}$ is the angle of incidence of the light $L_{11}$, $\theta_{12}$ is the angle of incidence of the light $L_{12}$, $\theta_{21}$ is the angle of incidence of the light $L_{21}$ and $\theta_{22}$ is the angle of incidence of the light $L_{22}$, and wherein $\theta_0 \neq 0$.

If the angles of incidence are set as above, diffraction lights from the diffraction grating 8 are as follow:

(a) positive first order diffraction light of the light $L_{11}$ and negative first order diffraction light of the light $L_{22}$ are diffracted in the same $-\theta_0$ direction; and (b) positive first order diffraction light of the light $L_{21}$ and negative first order diffraction light of the light $L_{12}$ are diffracted in the same $\theta_0$ direction.

With this arrangement, lights of different wavelengths are not mixed until they reach the diffraction grating on the wafer. Further, desirably $\theta_0$ may be determined so as to avoid that diffraction lights of particular orders of the lights $L_{11}$ and $L_{22}$ advance in the $\theta_0$ direction and that the diffraction lights of particular orders of the lights $L_{21}$ and $L_{12}$ advance in the $-\theta_0$ direction. Namely, the following relation should preferably be satisfied:

$$2\theta_0 \neq M \times \sin^{-1}(\lambda_0/P)$$

(M is a positive integer)

If the deviation between the reference position and the wafer position (the center of the diffraction grating) as determined by the position detecting system is $\Delta x$, then the complex amplitude of each diffraction light is expressed as follows:

(a) positive first order light of the light $L_{11}$: $E_{11}$ $E_{11} = A_{11}\exp[i(2\pi\gamma_1 t + \delta_0 + \delta_1)]$ (b) negative first order light of the light $L_{22}$: $E_{22}$ $E_{22} = A_{22}\exp[i(2\pi\gamma_2 t - \delta_0 + \delta_2)]$ (c) positive first order light of the light $L_{21}$: $E_{21}$ $E_{21} = A_{21}\exp[i(2\pi\gamma_2 t + \delta_0 + \delta_2)]$ (d) negative first order light of the light $L_{12}$: $E_{12}$ $E_{12} = A_{12}\exp[i(2\pi\gamma_1 t - \delta_0 + \delta_1)]$ where $\delta_0 = 2\pi\Delta x/P$ and wherein $\delta_1$ and $\delta_2$ represent phase noises applied to the lights $L_1$ and $L_2$ in a portion between the acoustooptic modulator 4 or 5 to the Kester prism 6 (the portion from the prism 6 to the wafer is included in the projection lens, and the noise can be substantially disregarded).

The two lights in the $-\theta_0$ direction go by way of a mirror 9A, and they are combined with each other by means of a light intensity detector (detecting means) 10A. Thus, the light intensity $I_1$ such as follows is detected:

$$I_1 = |E_{11} + E_{22}|^2 \qquad (1)$$
$$= A_{11}^2 + A_{22}^2 + 2A_{11}A_{22}\cos[2\pi(\nu_1 - \nu_2) + 2 \times \delta_0 + \delta_1 - \delta_2]$$

Similarly, the two lights in the $\theta_0$ direction go by way of a mirror 9B, and they are combined with each other by means of a light intensity detector (detecting means) 10B. The following light intensity $I_2$ is detected:

$$I_2 = |E_{21} + E_{12}|^2 \qquad (2)$$
$$= A_{21}^2 + A_{12}^2 + 2A_{21}A_{12}\cos[2\pi(\nu_1 - \nu_2) - 2\delta_0 + \delta_1 - \delta_2]$$

It is to be noted here that the Fourier transformation lens 7 and the mirror 9 (9A, 9B) provide a combining means.

The third terms in equation (1) and equation (2) each represents what can be called a "light beat signal", and an alternate signal of a frequency $(\gamma_1 - \gamma_2)$ is obtainable. If the diffraction grating 8 displaces by $\Delta x$, in equation (1) the phase of the light beat signal delays by $2\delta_0 = 4\pi\Delta x/P$ (radian). In equation (2) on the other hand, the phase of the light beat signal gains an advance of $2\delta_0 = 4\pi\Delta x/P$ (radian).

These two light beat signals are supplied to a position calculating means 11. In this calculating means, one of the light beat signals is applied to a phase detector of the calculating means as a signal, but the other light beat signal is applied to the phase detector as a reference signal. Then, the phase difference $\Phi$ between these two signals is measured in accordance with the following equation:

$$\begin{aligned}\Phi &= (2\delta_0 + \delta_1 - \delta_2) - (-\delta_0 + \delta_1 - \delta_2) \\ &= 4\delta_0 \\ &= 8\pi\Delta x/P\end{aligned} \quad (3)$$

Figure 1:
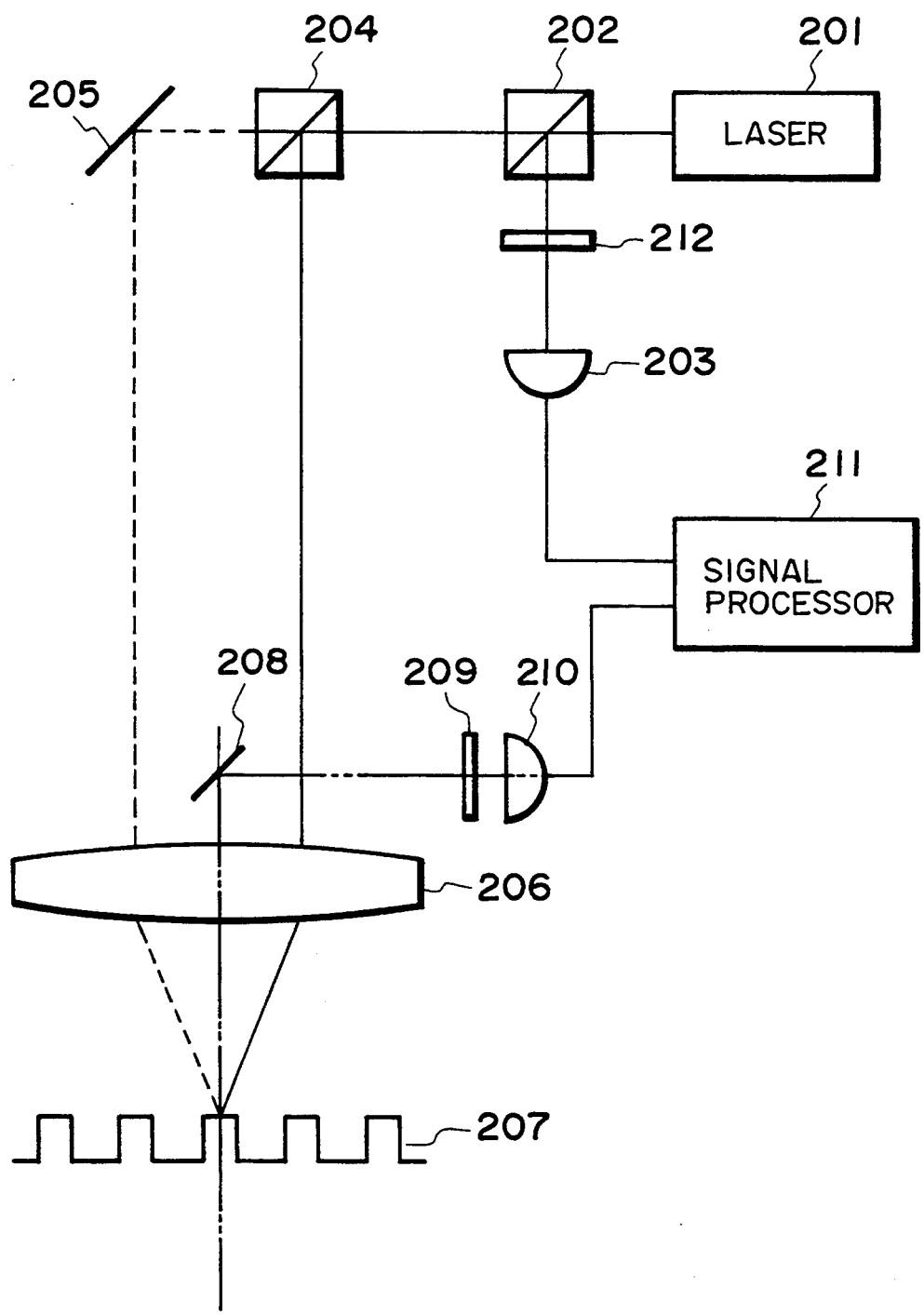
FIG. 1 is a schematic view for explaining the principle of a known position detecting system based on an optical heterodyne interference method.

From the thus measured phase difference, the positional deviation $\Delta x$ is calculated, and corresponding information is supplied to the alignment controller 107 of FIG. 1.

In this position detecting system, as seen from equation (3), for the same positional deviation, there is a phase difference of twice as large as the phase difference $4\pi\Delta x/P$ obtainable in accordance with the known method. Namely, a position detection resolution of twice as high as attainable with the known method, is assured. Moreover, phase noises $\delta_1$ and $\delta_2$ which are added to the phase to be measured, with the known method, are canceled. Thus, stable detection is assured.

In the first embodiment, ±first order light of the diffraction light from the diffraction grating 8 is used. However, since the diffraction grating 8 of the wafer is covered by a resist, there is a case where the light intensity of the ±first order light is low and the other ($\pm N$)-th order light has a high intensity. In consideration of this, such ($\pm N$)-th order diffraction light may be used.

When ($\pm N$)th order diffraction light is to be used, the positions of incidence of the light $L_1$ and $L_2$ impinging on the Kester prism 7 may be changed, and the angles of incidence of the four lights illuminating the wafer may be set as follows:

$$\theta_{11} = -\sin^{-1}(N\lambda_0/P) - \theta_0$$

$$\theta_{12} = -\theta_{11}$$

$$\theta_{21} = -\sin^{-1}(N\lambda_0/P) + \theta_0$$

$$\theta_{22} = -\theta_{21}$$

wherein $\theta_{11}$ is the angle of incidence of the light $L_{11}$, $\theta_{12}$ is the angle of incidence of the light $L_{12}$, $\theta_{21}$ is the angle of incidence of the light $L_{21}$ and $\theta_{22}$ is the angle of incidence of the light $L_{22}$. On that occasion, for the same positional deviation, there occurs a phase change of N times larger than that of the first embodiment.

For setting the angles of incidence of the four lights, the positions of the four lights $L_{11}$, $L_{12}$, $L_{21}$ and $L_{22}$ upon the Fourier transformation lens 7 may be adjusted. A possible example may be such that: between the prism 6 and the Fourier transformation lens 7, parallel flat plates are disposed on the paths of the four lights, respectively; and a driving means is provided to change and adjust inclination of each parallel flat plate so as to adjust the position of incidence of the corresponding light. As an alternative, the positions of incidence of the lights $L_1$ and $L_2$ upon the prism 6 may be adjusted. A practical example therefor may be such that: between the prism 6 and the acoustooptic modulators 4 and 5, parallel flat plates are disposed on the paths of the two lights, respectively; and a driving means is provided to change and adjust inclination of each parallel flat plate to adjust the position of incidence of the corresponding light.

As a matter of course, if a diffraction grating having a different pitch is used, the angles of incidence of the four lights may be adjusted in accordance with any one of the methods described above.

While the invention has been described with reference to the structures disclosed herein, it is not confined to the details set forth and this application is intended to cover such modifications or changes as may come within the purposes of the improvements or the scope of the following claims.

What is claimed is:

1. A position detecting system for detecting a position of an object, said system comprising:

light producing means for producing lights being mutually coherent and having first and second frequencies, respectively, different from each other;

an optical system comprising (i) light dividing means for dividing the light of the first frequency into a first light and a second light, and for dividing the light of the second frequency into a third light and a fourth light, and (ii) light guiding means for projecting the first, second, third and fourth lights upon a diffraction grating on the object at different angles of incidence, respectively, wherein the first light and the fourth light are diffracted by the diffraction grating in a first direction while the second light and the third light are diffracted by the diffraction grating in a second direction different from the first direction; and a detection system comprising (i) first detecting means for detecting a first beat signal produced through interference between diffraction light resulting from diffraction of the first light by the diffraction grating and diffraction light resulting from diffraction of the fourth light by the diffraction grating, (ii) second detecting means for detecting a second beat signal produced through interference between diffraction light resulting from diffraction of the second light by the diffraction grating and diffraction light resulting from diffraction of the third light by the diffraction grating, and (iii) position measuring means for detecting a phase difference between the first and second beat signals to determine the position of the object, wherein the phases of the first and second beat signals advance oppositely with a displacement of the object.

2. A system according to claim 1, wherein said light producing means comprises a light source for providing coherent light of a single frequency, and means for dividing the light from said light source into two and for imparting a frequency shift to at least one of the two lights.

3. A system according to claim 1, wherein the angles of incidence of the first, second, third and fourth lights upon the diffraction grating are determined in accordance with the following relations:

$$\theta_1 = -\sin^{-1}(N\lambda_0/P) - \theta_0$$

$$\theta_2 = -\theta_1$$

$$\theta_3 = -\sin^{-1}(N\lambda_0/P) + \theta_0$$

$$\theta_4 = -\theta_3$$

where $\theta_1$ is the angle of incidence of the first light, $\theta_2$ is the angle of incidence of the second light, $\theta_3$ is the angle of incidence of the third light, $\theta_4$ is the angle of incidence of the fourth light, $\lambda_0$ is the wavelength substantially the same as that of light having the first or second frequency, P is the pitch of the diffraction grating, N is an integer and $\theta_0$ is a value not equal to zero.

4. A system according to claim 3, wherein said first detecting means detects light diffracted by the diffraction grating in a $-\theta_0$ direction and wherein said second detecting means detects light diffracted by the diffraction grating in a $\theta_0$ direction.

5. A system according to claim 1, wherein said optical system comprises means for adjusting the angles of incidence of the first, second, third and fourth lights upon the diffraction grating.

6. A system according to claim 5, wherein said light guiding means determines the angles of incidence of the first, second, third and fourth lights upon the diffraction grating in accordance with the positions of incidence of the first, second, third and fourth lights, respectively, upon said light guiding means, and wherein said incidence angle adjusting means adjusts the positions of incidence of the first to fourth lights upon said light guiding means.

7. A system according to claim 6, wherein said light dividing means comprises an optical element having a half mirror, and wherein said incidence angle adjusting means adjusts the positions of incidence of the light of the first frequency and the light of the second frequency upon said optical element.

8. A system according to claim 7, wherein said optical element comprises a Kester prism.

9. A method of detecting a position of an object, said method comprising:
  a light producing step for producing lights being mutually coherent and having first and second frequencies, respectively, different from each other;
  a light dividing step for dividing the light of the first frequency into a first light and a second light, and dividing the light of the second frequency into a third light and a fourth light;
  a light guiding step for projecting the first, second, third and fourth lights upon a diffraction grating on the object at different angles of incidence, respectively, wherein the first light and the fourth light are diffracted by the diffraction grating in a first direction while the second light and the third light are diffracted by the diffraction grating in a second direction different from the first direction;
  a first detecting step for detecting a first beat signal produced through interference between diffraction light resulting from diffraction of the first light by the diffraction grating and diffraction light resulting from diffraction of the fourth light by the diffraction grating;
  a second detecting step for detecting a second beat signal produced through interference between diffraction light resulting from diffraction of the second light by the diffraction grating and diffraction light resulting from diffraction of the third light by the diffraction grating; and
  a position measuring step for detecting a phase difference between the first and second beat signals to determine the position of the object, wherein the phases of the first and second beat signals advance oppositely with a displacement of the object.

10. A method according to claim 9, wherein, in said light producing step, light from a light source which provides coherent light of a single frequency is divided into two and a frequency shift is imparted to at least one of the two lights.

11. A method according to claim 9, wherein the angles of incidence of the first, second, third and fourth lights upon the diffraction grating are determined in accordance with the following relations:

$$\theta_1 = -\sin^{-1}(N\lambda_0/P) - \theta_0$$

$$\theta_2 = -\theta_1$$

$$\theta_3 = -\sin^{-1}(N\lambda_0/P) + \theta_0$$

$$\theta_4 = -\theta_3$$

where $\theta_1$ is the angle of incidence of the first light, $\theta_2$ is the angle of incidence of the second light, $\theta_3$ is the angle of incidence of the third light, $\theta_4$ is the angle of incidence of the fourth light, $\lambda_0$ is the wavelength substantially the same as that of light having the first or second frequency, P is the pitch of the diffraction grating, N is an integer and $\theta_0$ is a value not equal to zero.

12. A method according to claim 11, wherein, in said first detecting step, light diffracted by the diffraction grating in a $-\theta_0$ direction is detected, and wherein, in said second detecting step, light diffracted by the diffraction grating in a $\theta_0$ direction is detected.

13. A method according to claim 9, further comprising an adjusting step for adjusting the angles of incidence of the first, second, third and fourth lights upon the diffraction grating.

14. A method according to claim 13, wherein, in said light guiding step, the angles of incidence of the first, second, third and fourth lights upon the diffraction grating are determined in accordance with the positions of incidence of the first, second, third and fourth lights, respectively, upon the diffraction grating, and wherein, in said adjusting step, the positions of incidence of the first to fourth lights are adjusted.

15. A method according to claim 14, wherein, in said light dividing step, an optical element having a half mirror is used to divide the light, and wherein, in said adjusting step, the positions of incidence of the light of the first frequency and the light of the second frequency upon the optical element are adjusted.

16. A method according to claim 15, wherein the optical element comprises a Kester prism.

17. An exposure apparatus for detecting the position of a diffraction grating formed on a wafer and for projecting a pattern of a reticle onto the wafer, said apparatus comprising:

a movable stage on which the wafer is to be placed;

light producing means for producing lights being mutually coherent and having first and second frequencies, respectively, different from each other;

an optical system comprising (i) light dividing means for dividing the light of the first frequency into a first light and a second light, and for dividing the light of the second frequency into a third light and a fourth light, and (ii) light guiding means for projecting the first, second, third and fourth lights upon the diffraction grating on the wafer at different angles of incidence, respectively, wherein the first light and the fourth light are diffracted by the diffraction grating in a first direction while the second light and the third light are diffracted by the diffraction grating in a second direction different from the first direction;

a detection system comprising (i) first detecting means for detecting a first beat signal produced through interference between diffraction light resulting from diffraction of the first light by the diffraction grating and diffraction light resulting from diffraction of the fourth light by the diffraction grating, (ii) second detecting means for detecting a second beat signal produced through interference between diffraction light resulting from diffraction of the second light by the diffraction grating and diffraction light resulting from diffraction of the third light by the diffraction grating and (iii) position measuring means for detecting a phase difference between the first and second beat signals to determine the position of the object, wherein the phases of the first and second beat signals advance oppositely with a displacement of the object; and a control system for moving said movable stage to place the wafer at a predetermined position, on the basis of the position of the wafer determined by said position measuring means, and for controlling said apparatus to transfer the pattern of the reticle onto the wafer.

18. An apparatus according to claim 17, further comprising a projection optical system for projecting the pattern of the reticle upon the wafer, and wherein said light guiding means comprises said projection optical system.

19. An exposure method for detecting the position of a diffraction grating formed on a wafer and for projecting a pattern of a reticle upon the wafer, said method comprising:

a light producing step for producing lights being mutually coherent and having first and second frequencies, respectively, different from each other;

a light dividing step for dividing the light of the first frequency into a first light and a second light, and dividing the light of the second frequency into a third light and a fourth light;

a light guiding step for projecting the first, second, third and fourth lights upon a diffraction grating on the object at different angles of incidence, respectively, wherein the first light and the fourth light are diffracted by the diffraction grating in a first direction while the second light and the third light are diffracted by the diffraction grating in a second direction different from the first direction;

a first detecting step for detecting a first beat signal produced through interference between diffraction light resulting from diffraction of the first light by the diffraction grating and diffraction light resulting from diffraction of the fourth light by the diffraction grating;

a second detecting step for detecting a second beat signal produced through interference between diffraction light resulting from diffraction of the second light by the diffraction grating and diffraction light resulting from diffraction of the third light by the diffraction grating;

a position measuring step for detecting a phase difference between the first and second beat signals to determine the position of the object, wherein the phases of the first and second beat signals advance oppositely with a displacement of the object; and a control step for moving the wafer to a predetermined position, on the basis of the position of the wafer determined in said position measuring step, and for transferring the pattern of the reticle onto the wafer.

20. A method according to claim 19, wherein the pattern of the reticle is projected on the wafer through a projection optical system, and said light guiding step uses the projection optical system.

* * * * *

UNITED STATES PATENT AND TRADEMARK OFFICE
CERTIFICATE OF CORRECTION

PATENT NO. : 5,448,357
DATED : September 5, 1995
INVENTOR(S) : MASATO MURAKI

It is certified that error appears in the above-indentified patent and that said Letters Patent is hereby corrected as shown below:

ON THE COVER PAGE: Item [56]

Under "FOREIGN PATENT DOCUMENTS"

"5087530    4/1993   Japan" should read
--5-087530   4/1993   Japan--.

COLUMN 5:

Line 27, "quency $\gamma_0$," should read --quency $\nu_0$,--;
Line 34, "frequency $\gamma_0$." should read --frequency $\nu_0$.--;
Line 37, "$\gamma_1$" should read --$\nu_1$--;
Line 38, "$\gamma_2$" should read --$\nu_2$--; and
Line 39, "$\lambda 2_2$)." should read ----$\lambda_2$).--.

COLUMN 6:

Line 33, "$A_{11}\exp[i(2\pi\gamma_1 t+\delta_0+\delta_1)]$" should read --$A_{11}\exp[i(2\pi\nu_1 t+\delta_0+\delta_1)]$--;
Line 35, "$E_{22}=A_{22}\exp[i(2\pi\gamma_2 t-\delta_0+\delta_2)]$" should read --$E_{22}=A_{22}\exp[i(2\pi\nu_2 t-\delta_0+\delta_2)]$;
Line 37, "$A_{21}\exp[i(2\pi\gamma_2 t+\delta_0+\delta_2)]$" should read --$A_{21}\exp[i(2\pi\nu_2 t+\delta_0+\delta_2)]$--;
Line 39, "$E_{12}=A_{12}\exp[i(2\pi\gamma_1 t-\delta_0+\delta_1)]$" should read --$E_{12}=A_{12}\exp[i(2\pi\nu_1 t-\delta_0+\delta_1)]$--; and

UNITED STATES PATENT AND TRADEMARK OFFICE
CERTIFICATE OF CORRECTION

PATENT NO. : 5,448,357
DATED : September 5, 1995
INVENTOR(S) : MASATO MURAKI

It is certified that error appears in the above-indentified patent and that said Letters Patent is hereby corrected as shown below:

Line 56, "$A^2_{11} + A^2_{22} + 2A_{11}A_{22}\cos[2\pi(\nu_1 - \nu_2) + 2 \times \delta_0 +$" should read --$A^2_{11} + A^2_{22} + 2A_{11}A_{22}\cos[2\pi(\nu_1 - \nu_2) + 2\delta_0 +$--.

COLUMN 7:

Line 6, "$(\gamma_1-\gamma_2)$" should read --$(\nu_1-\nu_2)$; and
Equation 3, "$\Phi = (2\delta_0 + \delta_1 - \delta_2) - (-\delta_0 + \delta_1 - \delta_2)$" should read --$\Phi = (2\delta_0 + \delta_1 - \delta_2) - (-2\delta_0 + \delta_1 - \delta_2)$--.

Signed and Sealed this

Twelfth Day of March, 1996

Attest:

BRUCE LEHMAN

*Attesting Officer*       Commissioner of Patents and Trademarks